(12) United States Patent
Seok

(10) Patent No.: US 12,722,470 B2
(45) Date of Patent: Sep. 1, 2026

(54) DEVICE COMPRISING COUPLED STRUCTURE BODY COMBINING BATTERY CROSS MEMBER AND SIDE MEMBER

(71) Applicants: Hyundai Motor Company, Seoul (KR); Kia Corporation, Seoul (KR)

(72) Inventor: Dong Yoon Seok, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 212 days.

(21) Appl. No.: 18/823,083

(22) Filed: Sep. 3, 2024

(65) Prior Publication Data

US 2025/0222753 A1 Jul. 10, 2025

(30) Foreign Application Priority Data

Jan. 10, 2024 (KR) ........................ 10-2024-0004365

(51) Int. Cl.

| | |
|---|---|
| ***B60K 1/04*** | (2019.01) |
| ***B60L 50/64*** | (2019.01) |
| ***B62D 25/20*** | (2006.01) |
| ***B62D 27/02*** | (2006.01) |

(52) U.S. Cl.

CPC ............ *B60K 1/04* (2013.01); *B62D 25/2036* (2013.01); *B62D 27/023* (2013.01); *B60K 2001/0438* (2013.01)

(58) Field of Classification Search

CPC ... B60K 1/04; B60K 2001/0438; B60L 50/64; B62D 25/2036; B62D 27/023; H01M 50/242; H01M 50/289; H01M 2220/20; Y02E 60/10

See application file for complete search history.

(56) References Cited

U.S. PATENT DOCUMENTS

| | | | | |
|---|---|---|---|---|
| 2013/0088045 | A1 | 4/2013 | Charbonneau et al. | |
| 2019/0359260 | A1* | 11/2019 | Tsuyuzaki | H01M 50/249 |
| 2021/0351470 | A1* | 11/2021 | Uemura | H01M 50/249 |

FOREIGN PATENT DOCUMENTS

| | | | |
|---|---|---|---|
| EP | 3616957 | B | 9/2021 |
| JP | 4302152 | B | 7/2009 |
| KR | 10-1896704 | B | 9/2018 |
| KR | 10-2412402 | B | 6/2022 |
| KR | 2023-0043412 | A | 3/2023 |
| KR | 2023-0097806 | A | 7/2023 |
| WO | WO 2023-085162 | A | 5/2023 |

* cited by examiner

*Primary Examiner* — Tinh T Dang

(74) *Attorney, Agent, or Firm* — MORGAN, LEWIS & BOCKIUS LLP

(57) ABSTRACT

A coupled structure body combining a battery cross member and a side member includes a cross member, configured to cover side surfaces of a battery pack and including extension members each extending in a longitudinal direction from a corresponding one of the opposite end portions of the cross member, and a side member, disposed perpendicular to the cross member and including a slit into which the extension member is mounted, wherein the slit in the side member and the extension member are welded to each other.

20 Claims, 3 Drawing Sheets h1
120
100
110
120
h1

DEVICE COMPRISING COUPLED STRUCTURE BODY COMBINING BATTERY CROSS MEMBER AND SIDE MEMBER

CROSS-REFERENCE TO RELATED APPLICATION

The present application claims priority to Korean Patent Application No. 10-2024-0004365, filed on Jan. 10, 2024, the entire contents of which is incorporated herein for all purposes by this reference.

BACKGROUND OF THE PRESENT DISCLOSURE

Field of the Present Disclosure

The present disclosure relates to a coupled structure body combining a battery cross member and a side member. More particularly, it relates to a coupled structure body combining a battery cross member and a side member, wherein the structure body is capable of dispersing a collision load applied to a battery due to a structure in which the cross member and the side member are disposed at a direction where a collision occurs, and capable of supporting a module load without a through bolt.

Description of Related Art

Generally, an electric vehicle is divided into a pure electric vehicle (EV) that runs by driving a traction motor, a hybrid electric vehicle (HEV) that runs by an engine and a traction motor, and a fuel cell electric vehicle (FCEV) that runs by driving a traction motor with power generated from a fuel cell.

The electric vehicle includes a traction motor for driving the vehicle, and a battery as a power storage to supply power to the traction motor. Well-known examples of the battery include nickel-hydride and lithium-polymer batteries.

The batteries form a battery pack in which a plurality of battery cells is connected in series or parallel, and the battery pack has a structure in which the battery cells and a printed circuit board (PCB) board including a protection circuit module (PCM) are combined.

The battery pack structure includes a battery frame to protect the cells placed therein in the event of a collision of a vehicle and prevent the battery from being damaged in the front, rear, and side directions of the vehicle to protect passengers on board from the collision.

The battery frame is assembled by fastening a battery cross beam as a reinforcement structure to the side sill of a vehicle body.

Meanwhile, the battery frame includes a side member and a cross member. In the event of a side collision, the side member deforms to primarily absorb the collision energy, and the cross member supports the battery frame to prevent further deformation.

For the side member to effectively absorb collision energy and achieve target reaction force in the event of side collision of a vehicle, it is necessary to increase the thickness of the material.

However, increasing the thickness of the side member of the battery frame not only increases manufacturing costs but reduces production efficiency and hinders reducing the weight of the vehicle body.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery frame configured for securing structural performance, dispersing collision loads applied to the battery, and improving durability.

Another object of the present disclosure is to provide a battery frame configured for reducing manufacturing costs without increasing the thickness of a side member of the battery frame, improving production efficiency, and reducing the weight of a vehicle body by slimming the structure thereof and thinning the material thereof.

The objects of the present disclosure are not limited to the foregoings, and other objects of the present disclosure not mentioned herein may be understood based on the following description, and may be understood more clearly through the exemplary embodiments of the present disclosure. Furthermore, the objects of the present disclosure may be realized by means and combinations thereof indicated in the claims.

In one aspect, the present disclosure provides a coupled structure body combining a battery cross member and a side member, the coupled structure body including the cross member, configured to cover side surfaces of a battery pack and including extension members each extending in a longitudinal direction from a corresponding one of the opposite end portions of the cross member, and the side member, disposed perpendicular to the cross member and including a slit into which the extension member is mounted. Here, the slit in the side member and the extension member may be welded to each other.

In an exemplary embodiment of the present disclosure, the extension member of the cross member may have formed therethrough a first hole.

In another exemplary embodiment of the present disclosure, the side member may have formed therethrough a second hole at a position corresponding to the first hole.

In yet another exemplary embodiment of the present disclosure, the side member may include a body portion configured to protect the battery pack, and a support portion protruding from a side surface of the body portion.

In yet another exemplary embodiment of the present disclosure, the support portion of the side member may include an internal space, and the extension member may be inserted into the internal space and fixed therein.

In still yet another exemplary embodiment of the present disclosure, the battery pack may be accommodated on a plate configured to support the battery pack from therebelow, and the cross member may be fixed to the plate.

In a further exemplary embodiment of the present disclosure, the cross member may include a fixation portion, fixed to the plate and configured to section the battery packs, and the extension member may include a cross section smaller in width than a cross section of the fixation portion.

In another further exemplary embodiment of the present disclosure, the cross member may be provided in plural number and be horizontally spaced from one another in a battery pack mounting space.

In yet another further exemplary embodiment of the present disclosure, the cross member may be disposed to be parallel and perpendicular to one another.

In yet another further exemplary embodiment of the present disclosure, the first hole in the cross member may be formed at a position corresponding to the second hole in the side member, the first hole in the cross member may include a mounting pipe inserted thereinto, and the cross member and the mounting pipe may be welded to each other.

In still yet another further exemplary embodiment of the present disclosure, the slit in the side member may include an area corresponding to the cross-sectional area of the extension member.

In a still further exemplary embodiment of the present disclosure, the slit in the side member and the extension member may be welded to each other in a Metal Inert Gas (MIG) welding manner to form a welded portion between the side member and the extension member.

In yet another further exemplary embodiment of the present disclosure, the extension member of the cross member may be welded to a vehicle body.

In a yet still further exemplary embodiment of the present disclosure, the cross member and the side member may be made of either aluminum (Al) or steel.

In another aspect, the present disclosure provides a device including a coupled structure body combining a battery cross member and a side member, the device including a battery pack, mounted in a battery pack mounting space, configured to supply power to a traction motor, and provided in plural number, and the coupled structure body, configured to section and fix the battery packs and coupled to a vehicle body. Here, the coupled structure body may include the cross member, configured to cover the side surfaces of the battery pack and including extension members each extending in a longitudinal direction from a corresponding one of the opposite end portions of the cross member, and the side member, disposed perpendicular to the cross member and including a slit into which the extension member is mounted, wherein the extension member may be fixedly coupled to the vehicle body.

In an exemplary embodiment of the present disclosure, the extension member of the cross member may have formed therethrough a first hole, and the side member may have formed therethrough a second hole at a position corresponding to the first hole.

In another exemplary embodiment of the present disclosure, the first hole in the cross member may include a mounting pipe inserted thereinto, and the cross member and the mounting pipe may be welded to each other.

In yet another exemplary embodiment of the present disclosure, the slit in the side member may include an area corresponding to the cross-sectional area of the extension member.

In yet another exemplary embodiment of the present disclosure, the slit in the side member and the extension member may be welded to each other in a Metal Inert Gas (MIG) welding manner to form a welded portion between the side member and the extension member.

In still yet another exemplary embodiment of the present disclosure, the cross member and the side member may be made of either aluminum (Al) or steel.

Other aspects and exemplary embodiments of the present disclosure are discussed infra.

It is to be understood that the term "vehicle" or "vehicular" or other similar terms as used herein are inclusive of motor vehicles in general, such as passenger vehicles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

Figures 1, 2:
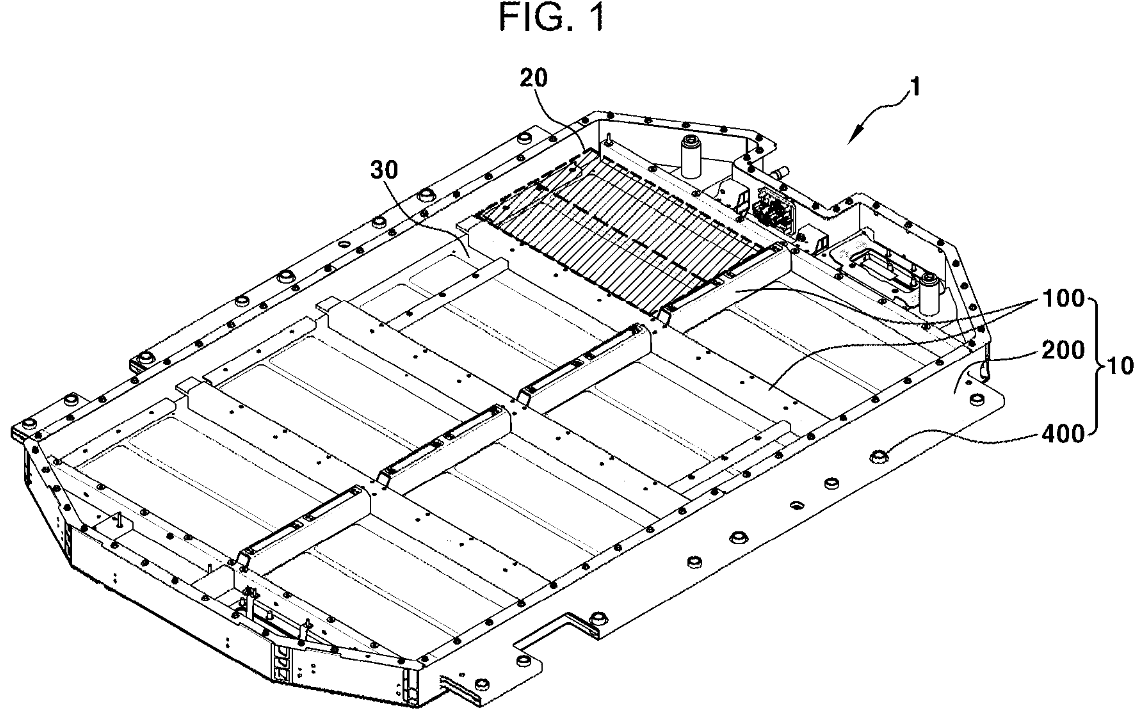
FIG. 1 is a perspective view exemplarily illustrating a coupled structure body combining a cross member and a side member in which a battery pack is mounted.
FIG. 2 is a perspective view exemplarily illustrating a cross member.

It should be understood that the appended drawings are not necessarily to scale, presenting a somewhat simplified representation of various exemplary features illustrative of the basic principles of the present disclosure. The predetermined design features of the present disclosure, including, for example, predetermined dimensions, orientations, locations, and shapes, will be determined in portion by the intended application and usage environment.

In the figures, the reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure is described in detail with reference to the accompanying drawings. The exemplary embodiments of the present disclosure may be modified into various forms, and the scope of the present disclosure should not be construed as being limited to the following embodiments. The exemplary embodiments are provided to more completely explain the present disclosure to those skilled in the art.

Furthermore, terms such as ".portion", ".unit", ".module", etc. used in the present specification each refer to a unit that processes at least one function or operation, and may be implemented as hardware, software or a combination thereof.

The terminology used herein is for describing various exemplary embodiments only, and is not intended to be limiting. A singular representation may include a plural representation unless it represents a definitely different meaning from the context.

It will be understood that, although the terms "first", "second", etc. may be used herein to describe various similar elements, these elements should not be construed as being limited by these terms. These terms are only used to distinguish one element from another.

Hereinafter, an exemplary embodiment will be described in detail with reference to the accompanying drawings, and in the description provided with reference to the accompanying drawings, the same or corresponding components are assigned the same reference numerals, and a description thereof will not be repeated.

Figure 3:
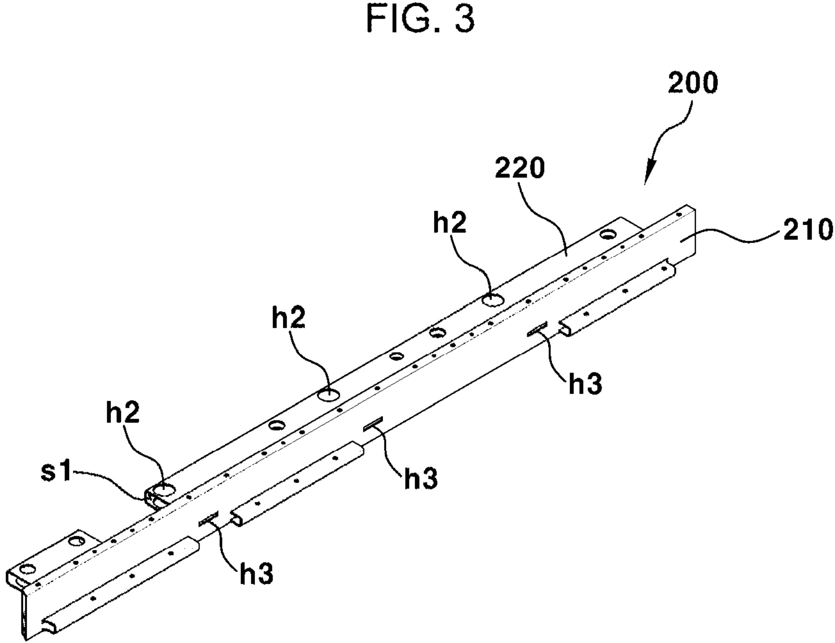
FIG. 3 is a perspective view exemplarily illustrating a side member.
Figure 4:
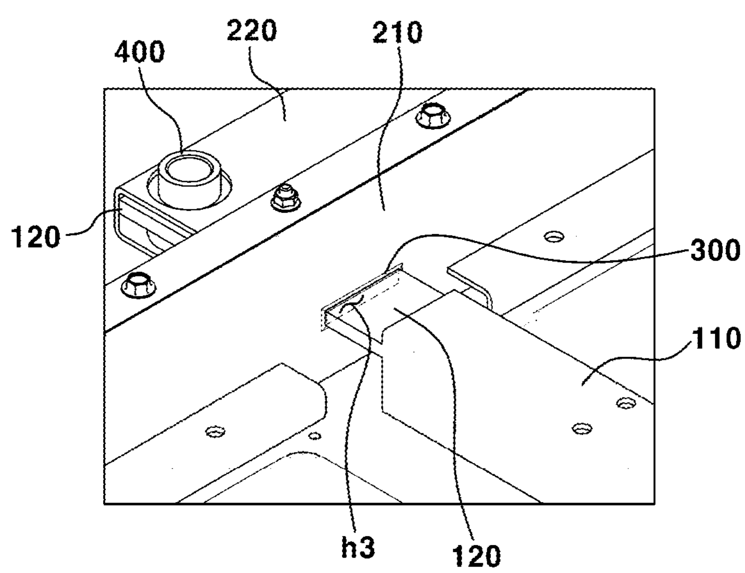
FIG. 4 illustrates a structure in which an extension member of a cross member is inserted through a slit in a side member and is accommodated in a support portion and fastened using a mounting pipe.
Figure 5:
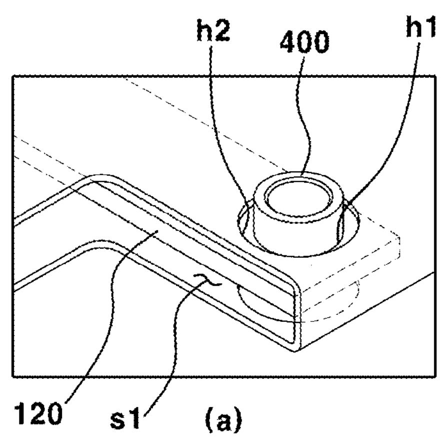
FIG. 5A is an above-perspective view exemplarily illustrating a state in which a mounting pipe is fastened to a cross member.
FIG. 5B is a below-perspective view exemplarily illustrating a state in which the mounting pipe is fastened to the cross member.
Figure 5:
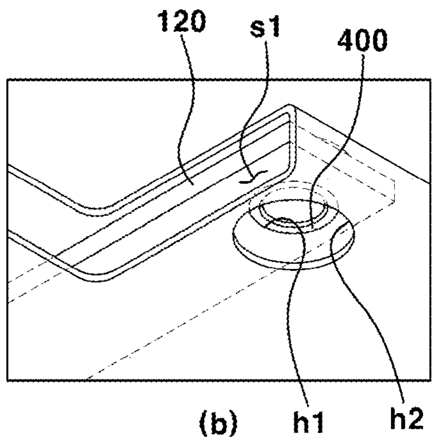

FIG. 1 is a perspective view exemplarily illustrating a coupled structure body combining a cross member and a side member in which a battery pack is mounted, FIG. 2 is a perspective view exemplarily illustrating a cross member, FIG. 3 is a perspective view exemplarily illustrating a side member, FIG. 4 illustrates a structure in which an extension member of a cross member is inserted through a slit in a side member and is accommodated in a support portion and fastened using a mounting pipe, FIG. 5A is an above-perspective view exemplarily illustrating a state in which a mounting pipe is fastened to a cross member, and FIG. 5B is a below-perspective view exemplarily illustrating a state in which the mounting pipe is fastened to the cross member.

First, as illustrated in FIG. 1, a coupled structure body 10 combining a battery cross member 100 and a side member 200 according to an exemplary embodiment of the present disclosure includes the cross member 100, configured to cover the side surfaces of a battery pack 20 and including extension members 120 each extending in a longitudinal direction from a corresponding one of the opposite end portions of the cross member 100, and a side member 200, disposed perpendicular to the cross member 100 and having formed therein a slit h3 into which the extension member 120 is inserted, wherein the slit h3 in the side member 200 and the extension member 120 are welded to each other. Moreover, the cross member 100 and the side member 200 in the coupled structure body 10 may be made of either aluminum (Al) or steel.

Referring to FIG. 2, the cross member 100 in the coupled structure body 10 of the present disclosure is provided in plural number and is horizontally spaced from one another in a battery mounting space. The cross members 100 are disposed to be parallel and perpendicular to one another. Furthermore, the cross member 100 includes a fixation portion 110, fixed to a plate 30 and configured to section the battery packs 20, and the extension members 120, each extending in a longitudinal direction from a corresponding one of the opposite end portions of the fixation portion 110.

The fixation portion 110 of the cross member 100 of the present disclosure is accommodated on the plate 30, and depending on implementation, may be fixedly coupled to the plate 30 using bolts and connected to a vehicle body.

The extension member 120 of the cross member 100 of the present disclosure may include a shape in which a corresponding one of the opposite end portions of the fixation portion 110 extends in a longitudinal direction, may include a cross section smaller in width than that of the fixation portion 110, and may have formed therethrough a first hole h1.

The first hole h1 in the extension member 120 is formed at a position corresponding to a second hole h2 in the side member 200, which will be described later, and may include a shape of a hole to allow a mounting pipe 400 to be inserted into the first hole h1. Although the first hole h1 in the extension member 120 is described to include a shape of a hole, the shape thereof is not limited thereto. The first hole h1 may include the shape of the slit h3, but may also have any shape as long as coinciding with the second hole h2 in the side member 200 and allowing easy welding with the mounting pipe 400.

Meanwhile, the cross member 100 of the present disclosure is implemented in a structure in which the opposite end portions of the extension member 120 is fixed to the side member 200. For example, when a load is applied from above toward the battery module 20, the load is not dispersed through a through bolt, but rather through the structure in which the opposite end portions of the cross member 100 are connected to the vehicle body. Accordingly, by reducing or omitting the internal through bolt used to fix the cross member 100 to the vehicle body, a structure that not only reduces manufacturing costs, but also improves production efficiency and makes the vehicle body structure slimmer and lighter may be implemented.

Next, referring to FIG. 3, the side member 200 in the coupled structure body 10 of the present disclosure is disposed to be perpendicular to the cross member 100, includes a body portion 210 configured to protect the battery pack 20 and a support portion 220 protruding from a side surface of the body portion 210, has formed therein the second hole h2, formed through the support portion 220, at a position corresponding to the first hole h1 in the cross member 100, and has formed therein the slit h3 into which the extension member 120 of the cross member 100 is inserted.

First, the body portion 210 of the side member 200 protects the battery pack 20 in the vehicle body, and may have formed therein the slit h3 into which the extension member 120 of the cross member 100 is inserted. The slit h3 in the body portion 210 may include an area corresponding to the cross-sectional area of the extension member 120 of the cross member 100. Although the slit h3 is illustrated to include a rectangular shape in FIG. 3, the slit h3 may include a shape of a hole as that of the first hole h1 described above, and not limited thereto. Moreover, the slit h3 may have any shape as long as allowing the extension member 120 to be stably inserted thereinto and easily welded therewith.

Next, the support portion 220 of the side member 200 of the present disclosure protrudes from a side surface of the body portion 210 and has formed therein an internal space si. The internal space si allows the extension member 120 to be accommodated in the support portion 220 therethrough.

The support portion 220 of the side member 200 of the present disclosure has formed therein the second hole h2 passing through the support portion 220. The second hole h2 is formed at a position corresponding to the first hole h1 in the extension member 120, and like the first hole h1, is a hole into which the mounting pipe 400 is inserted. The second hole h2 may include the shape of the slit h3 rather than the shape of a hole, but it is preferable to include the same shape as the first hole h1. The second hole h2 may have any shape as long as stably fixing the mounting pipe 400 in place.

Referring to FIG. 4, a welded portion 300 of the coupled structure body 10 of the present disclosure is formed when the extension member 120 is welded to the slit h3 in the side member 200. In other words, the welded portion 300 may be formed in a Metal Inert Gas (MIG) welding manner at an area where the side member 200 and the cross member 100 meet each other. The structure in which the side member 200 and the cross member 100 are stably and fixedly coupled to each other secures the watertight performance of the battery 20. For reference, it is preferable to combine the cross member 100 and the side member 200 together first, and then to connect a cooling block of the battery pack 20 later.

Accordingly, inserting the extension member 120 into the slit h3 in the side member 200 of the present disclosure and welding them together implement a structure in which the side member 200 and the cross member 100 are stably coupled to each other, achieving structural reinforcement.

Next, the mounting pipe 400 of the present disclosure will be described referring to FIG. 4, FIG. 5A and FIG. 5B.

The mounting pipe 400 of the coupled structure body 10 of the present disclosure includes a shape of a pipe vertically formed through, and is inserted into the first hole h1 in the cross member 100 and coupled to the cross member 100 by welding. The mounting pipe 400 of the present disclosure is directly connected to the cross member 100 by being welded therewith and the cross member 100 is directly connected to the vehicle body, providing strong support against load and vibration generated in the vehicle body. Furthermore, the mounting pipe 400 is made of a high-strength material to securely support the load and vibration generated in the vehicle body of the present disclosure.

Meanwhile, the mounting pipe 400 of the present disclosure is directly coupled to the cross member 100 by welding, implementing a structure cable of omitting the internal through bolt for fixing the cross member 100 to the plate 30.

As is apparent from the above description, the present disclosure may obtain the following effects by the configuration, combination, and operation relationship described above with the exemplary embodiment of the present disclosure.

According to an exemplary embodiment of the present disclosure, the structural performance of the battery frame may be secured and the collision load applied to the battery may be dispersed to thereby improve durability.

Moreover, the battery frame according to an exemplary embodiment of the present disclosure may reduce the manufacturing costs without increasing the thickness of the side member of the battery frame, may improve production efficiency, and may reduce the weight of the vehicle body by slimming the structure thereof and thinning the material thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A coupled structure body combining a battery cross member and a side member, the coupled structure body comprising:

the cross member, configured to cover side surfaces of a battery pack and including extension members each extending in a longitudinal direction from a corresponding one of opposite end portions of the cross member; and the side member, disposed perpendicular to the cross member and including a slit into which the extension member is mounted, wherein the slit in the side member and the extension member are welded to each other.

2. The coupled structure body of claim 1, wherein each extension member of the cross member includes a first hole.

3. The coupled structure body of claim 1, wherein the side member includes a second hole at a position corresponding to a first hole of each extension member.

4. The coupled structure body of claim 1, wherein the side member further includes:

a body portion configured to protect the battery pack; and a support portion protruding from a side surface of the body portion.

5. The coupled structure body of claim 4, wherein the support portion of the side member includes an internal space, and each extension member is inserted into the internal space through a corresponding slit and fixed in the internal space.

6. The coupled structure body of claim 1, wherein the battery pack is accommodated on a plate configured to support the battery pack from below the battery pack, and the cross member is fixed to the plate.

7. The coupled structure body of claim 1, wherein the battery pack is provided in plural number, wherein the cross member includes a fixation portion, fixed to a plate and configured to section the battery packs, and wherein each extension member extending from the fixation portion has a cross section smaller in width than a cross section of the fixation portion.

8. The coupled structure body of claim 1, wherein the cross member is provided in plural number and the plurality of cross members is horizontally spaced from one another in a battery pack mounting space.

9. The coupled structure body of claim 1, wherein the slit in the side member includes an area corresponding to a cross-sectional area of each extension member.

10. The coupled structure body of claim 2, wherein the side member includes a second hole at a position corresponding to the first hole, and wherein the first hole in the cross member is formed at a position corresponding to the second hole in the side member, the first hole in the cross member includes a mounting pipe inserted into the first hole, and the cross member and the mounting pipe are welded to each other.

11. The coupled structure body of claim 10, wherein the cross members are disposed to be parallel and perpendicular to one another.

12. The coupled structure body of claim 1, wherein the slit in the side member and each extension member are welded to each other in a Metal Inert Gas (MIG) welding manner to form a welded portion between the side member and each extension member.

13. The coupled structure body of claim 1, wherein each extension member of the cross member is welded to a vehicle body.

14. The coupled structure body of claim 1, wherein the cross member and the side member are made of either aluminum (AI) or steel.

15. An apparatus comprising a coupled structure body combining a cross member and a side member, the apparatus comprising:

a battery pack, mounted in a battery pack mounting space, configured to supply power to a traction motor, and provided in plural number; and the coupled structure body, configured to section and fix the battery packs and coupled to a vehicle body, wherein the coupled structure body includes:

the cross member, configured to cover side surfaces of the battery packs and including extension members each extending in a longitudinal direction from a corresponding one of opposite end portions of the cross member; and the side member, disposed perpendicular to the cross member and including a slit into which each extension member is mounted, and wherein each extension member is fixedly coupled to the vehicle body.

16. The apparatus of claim 15, wherein each extension member of the cross member includes a first hole, and the side member includes a second hole at a position corresponding to the first hole.

17. The apparatus of claim 16, wherein the first hole in the cross member includes a mounting pipe inserted into the first hole, and the cross member and the mounting pipe are welded to each other.

18. The apparatus of claim 15, wherein the slit in the side member includes an area corresponding to a cross-sectional area of each extension member.

19. The apparatus of claim 15, wherein the slit in the side member and each extension member are welded to each other in a Metal Inert Gas (MIG) welding manner to form a welded portion between the side member and each extension member.

20. The apparatus of claim 15, wherein the cross member and the side member are made of either aluminum (AI) or steel.

* * * * *